United States Patent
Hirano et al.

(10) Patent No.: US 7,525,716 B2
(45) Date of Patent: Apr. 28, 2009

(54) DISPLAY DEVICE AND DISPLAY APPARATUS

(75) Inventors: Shigenobu Hirano, Yokohama (JP);
Hiroyuki Takahashi, Yokohama (JP);
Ikue Kawashima, Yokohama (JP);
Takeshi Shibuya, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 237 days.

(21) Appl. No.: 11/366,402

(22) Filed: Mar. 3, 2006

(65) Prior Publication Data

US 2006/0204866 A1 Sep. 14, 2006

(30) Foreign Application Priority Data

Mar. 4, 2005 (JP) ............................. 2005-059793

(51) Int. Cl.
*G02F 1/153* (2006.01)
*G02F 1/03* (2006.01)

(52) U.S. Cl. ...................................... 359/270; 359/242

(58) Field of Classification Search ................ 359/242, 359/265, 269–270, 272–273, 277, 296; 250/70; 438/929

See application file for complete search history.

(56) References Cited

U.S. PATENT DOCUMENTS

| | | | |
|---|---|---|---|
| 4,746,200 A * | 5/1988 | Kamigaki ................... | 359/269 |
| 2003/0099884 A1 * | 5/2003 | Chiang et al. ............... | 429/233 |
| 2003/0184644 A1 | 10/2003 | Takahashi et al. | |
| 2004/0257633 A1 * | 12/2004 | Agrawal et al. ............. | 359/265 |
| 2006/0204866 A1 | 9/2006 | Hirano et al. | |

FOREIGN PATENT DOCUMENTS

| | | |
|---|---|---|
| JP | 2001-510590 | 7/2001 |
| JP | 2002-328401 | 11/2002 |
| JP | 2004-151265 | 5/2004 |
| WO | WO 2005/111709 A1 | 11/2005 |

OTHER PUBLICATIONS

U.S. Appl. No. 11/540,763, filed Oct. 2, 2006, Hirano et al.
U.S. Appl. No. 11/384,667, filed Mar. 21, 2006, Shibuya et al.
U.S. Appl. No. 11/366,402, filed Mar. 3, 2006, Hirano et al.
U.S. Appl. No. 11/856,311, filed Sep. 17, 2007, Hirano et al.

* cited by examiner

*Primary Examiner*—Scott J Sugarman
*Assistant Examiner*—Dawayne A Pinkney
(74) *Attorney, Agent, or Firm*—Oblon, Spivak, McClelland, Maier & Neustadt, P.C.

(57) ABSTRACT

To provide a display device which includes: a display electrode; a counter electrode provided to face the display electrode; a display layer provided on the counter electrode-side surface of the display electrode; and an electrolyte provided between the display electrode and the counter electrode, wherein the display layer comprises conductive or semi-conductive fine particles, the fine particles comprise an insulating or semi-conductive substance attached to the surface thereof, and the fine particles carry an organic electrochromic compound.

13 Claims, 2 Drawing Sheets

DISPLAY DEVICE AND DISPLAY APPARATUS

BACKGROUND OF THE INVENTION

1. Field of the Invention

The present invention relates to an electrochromic display device and a display apparatus using the electrochromic display device.

2. Description of the Related Art

Recently, much research effort has been made to electronic paper as an electronic medium that is expected to displace paper. In contrast to conventional displays including CRTs and liquid crystal displays (LCDs), electronic paper requires the following characteristics: being a reflective display device; high white reflectivity and contrast ratio; high definition display; memory effect; low-voltage drive capability; slimness; lightness; and inexpensiveness, for example. In terms of its display characteristics, in particular, it is required that electronic paper have as excellent a white reflectivity and contrast ratio as paper does, and the development of a display device offering all of these characteristics is far from easy. Although electronic paper technologies have heretofore been proposed, including reflective liquid crystal devices, electrophoretic display devices and toner electrophoretic displays, they are all poor in white reflectivity.

A phenomenon in which electrochromic materials applied with a voltage show a reversible color change during the electrochemical redox reaction is called electrochromism. Electrochromic (hereinafter abbreviated to "EC" in some case display devices, which utilize color change in EC compounds that cause such a phenomenon, have emerged as a candidate for electronic paper because they serve as a reflective display device, have high white reflectivity as well as a memory effort and can be driven at low voltage. For example, Japanese Patent Application Laid-Open (JP-A) No. 2001-510590, Japanese Patent Application Laid-Open (JP-A) No. 2002-328401, and Japanese Patent Application Laid-Open (JP-A) No. 2004-151265 disclose EC devices in which an organic EC compound is attached to the surface of semiconductor fines particles made of, for example, titanium oxide. Such EC devices are known for their ability of efficiently producing or removing colors by utilizing a surface-area effect of the semiconductor fine particles, as well as for their excellent repetition durability. Their memory effort however, lasts as short as 20 minutes or so while a voltage is not applied, thereby posing problems related to the improvement of their image-retaining properties.

SUMMARY OF THE INVENTION

It is an object of the present invention to provide a display device which has high white reflectivity, a memory effect, and capable of being driven at low voltage and has high image-retaining properties, and a display apparatus using the display device.

One reason why EC compositions in which an organic electrochromic (EC) compound is attached to conductive or semi-conductive fine particles are poor in image-retaining properties is the occurrence of gradual charge leakage, where charges in colored organic EC compounds gradually leak away through the fine particles, which causes the EC compounds to undesirably switch back to a non-colored state as a result of losing such charges. To avoid this problem, the present inventors have diligently conducted studies, and they have established that the use of conductive or semi-conductive fine particles having an insulating or semi-conductive substance attached to their surface can prevent the occurrence of charge leakage and to improve image-retaining properties without lowering the voltage at which colors are produced and reducing color-production efficiency.

The display device of the present invention includes: a display electrode; a counter electrode provided to face the display electrode; a display layer provided on the counter electrode-side surface of the display electrode; and an electrolyte provided between the display electrode and the counter electrode, wherein the display layer comprises conductive or semi-conductive fine particles, the fine particles comprises an insulating or semi-conductive substance attached to the surface thereof, and the fine particles carry an organic electrochromic compound.

The display apparatus of the present invention is one using the display device of the present invention.

Figure 1:
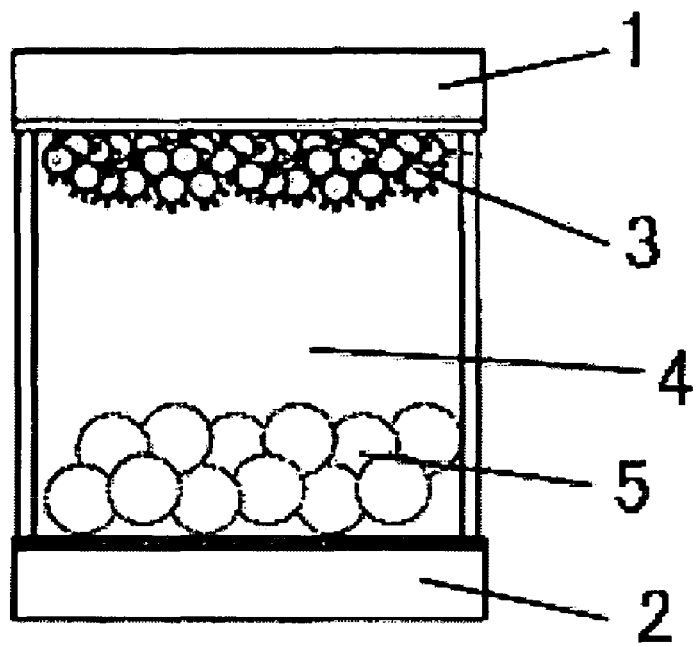
FIG. 1 shows an example of the configuration of a display device of the present invention.

DESCRIPTION OF THE PREFERRED EMBODIMENTS (Display Device)

The display device of the present invention includes a display electrode, a counter electrode provided so as to face the display electrode, a display layer provided on the counter electrode-surface of the display electrode, and an electrolyte provided between the display electrode and the counter electrode, and further includes an additional component on an as-needed basis.

The display layer contains conductive or semi-conductive fine particles having an insulating or semi-conductive substance attached to their surface, and the fine particles carry an organic electronic compound.

An electrode obtained by coating glass or a plastic film with a transparent conductive thin film made of, for example, IFO, FTO or ZnO is preferably used for the display electrode. The use a plastic film will lead to the manufacturing of a light, flexible display apparatus.

An electrode obtained by coating glass or a plastic film with a transparent conductive thin film made of, for example, ITO, FTO or ZnO, or an electrode obtained by coating glass or a plastic film with a conductive metallic film made of, for example, zinc or platinum can be used for the counter electrode. When a substrate coated with a transparent conductive thin film made of ITO, FTO, ZnO or the like is to be used as an counter electrode, the formation of conductive particles of larger surface area, such as tin oxide fine particles and ITO fine particles, can lead to efficient charge transfer.

The display layer contains conductive or semi-conductive fine particles having an insulating or semi-conductive substance attached to their surface, and an organic electrochromic compound.

For the conductive or semi-conductive fine particles, fine particles made of, for example, titanium oxide, zinc oxide or tin oxide, having an average primary particle diameter of about 5 nm to 50 nm, more preferably 5 nm to 20 nm, are preferably used. Such fine particles are rendered conductive or semi-conductive and thus allow charges to transfer between an electrolyte and an organic EC compound. In addition, since the fine particles have an average primary particle diameter of about 5 nm to 50 nm, they are of high surface area when attached to a smooth electrode surface, which enables efficient charge transfer. Furthermore, the fine particles are highly advantageous when used in display devices, because formation of a transparent film is made possible.

The average primary particle diameter can be determined by, for example, using an electron microscope.

Examples of an insulating or semi-conductive substance to be attached to the surface of conductive or semi-conductive fine particles include metal oxides, such as aluminum oxide, silicon oxide and zirconium oxide; and organic compounds such as polymers. Among these compounds, metal oxides are used in surface treatments for, for example, controlling the dispersiveness of particles, and are of great utility because they can be readily attached to the surface of conductive or semi-conductive fine particles.

Examples of the surface treatments include the sol-gel method in which alkoxide precursors of metal oxides are attained to the particle surface. In the display device of the present invention bonding of conductive or semi-conductive fine particles to the surface of an electrode by sintering leads to formation of a solid, conductive display layer. For this reason, surface treatments using metal oxides are more effuse than those using organic compounds.

Fine particles surface-treated with aluminum oxide, zirconium oxide, or a mixture of aluminum oxide and zirconium oxide are most preferable because display devices in which they are utilized can retain image for the longest time, which is considered to be attributed to the fact that aluminum oxide has excellent insulating properties.

The organic EC compounds are not particularly limited and can be appropriately selected depending on the intended use; examples thereof include viologen compounds, styryl compounds and phenoliane compounds. Among these, viologen compounds are most preferable because they produce colors upon reduction and can produce many odors depending on its molecular structure.

Examples of the viologen compounds include 1-Ethyl-1'-(2-phosphonoethyl)-4,4'-bipyridinium dichloride, 1-p-cyanophenyl-1'-(2-phosphonoethyl)-4,4'-bipyridinium dichloride, Bis(2-phosphonylethyl)-4,4'-bipyridinium dichloride and 1-Ethyl-1'-acetic acid-4,4'-bipyridinium dichloride.

Examples of the styryl compounds include 2-[2-[4-(dimethylamino)-5-carboxy-phenyl]ethenyl]-3,3-dimethylindolino[2,1-b]oxazolidine, 2-[2-[4-(dimethylamino)-5-carboxyl-phenyl]-1,3-butadienyl]-3,3-dimethylindolino[2,1-b]oxazclidine and 2-[2-[4-(dimethylamino)phenyl]-1,3-butadienyl]-3,3-dimethyl-5-sulfonylindolino[2,1-b]oxazolidine.

Examples of the phenoliane compounds include (2-Phenothiazin-10-yl-ethyl)-phosphinic acid, 3-Phenothiazin-10yl-propionic acid and 3-Phenothiazin-10-yl-methanesufonic acid.

Methods of attaching an organic EC compound to the conductive or semi-conductive fine particles are not particularly limited and can be appropriately selected depending on the intended use; for example, the following method can be adopted: dissolving an organic EC compound in water, alcohol or an organic solvent, and adding conductive or semi-conductive fine particles to the resultant solution.

Moreover, organic EC compounds preferably have an adsorption site that allows them to be attached to the particle surface. Examples of such an adsorption site include the structures of phosphonic acid, carboxylic acids, sulfonic acids and salicylic acid. In particular, high adsorption capacity of the phophonic acid structure makes it a most useful structure for such an adsorption site.

The thickness of the display layer is not particularly limited and can be appropriately set depending on the intended use; the thickness of the display layer is preferably 1 μm to 50 μm, more preferably 0.1 μm to 15 μm.

In the display device of the present invention it is preferable that a plurality of organic EC compounds be attached to conductive or semi-conductive fine particles. Organic EC compounds, such as viologen compounds, can produce different colors depending on their molecular structure. For example, simultaneous attachment of a blue-producing compound and a red-producing compound to the particle surface can lead to the production of aubergine (almost black). Accordingly, the display device of the present invention can be provided with the following advantage: it is possible to offer a wide range of color variations and to display a black color with high visibility.

In the display device of the present invention a display layer, which contains an organic EC compound, is formed in any given pattern. Even when a display layer is applied all over the surface of a transparent electrode-mounted substrate of the display device of the present invention, partial application of a voltage to a certain portion of the display layer allows only that portion to produce a color. However, such partial voltage application involves slight charge diffusion and thus sometimes causes the colored images to appear somewhat blurred. To avoid this, the display layer can be previously patterned with high resolution for each picture element to thereby prevent the occurrence of image blurring due to such charge diffusion. In this way it is possible to obtain sharp colored images.

In the display device of the present invention a white color reflective layer is provided. The display layer of the display device of the present invention shows a reversible color change by switching back and forth between a transparent state and a colored state. For this reason, when the display device of the present invention is used as a reflective display device, the degree of whiteness of the device is dependent on the characteristics of the white color reflective layer. The use of material obtained by dispersing white particles into resin or the like as a white color reflective layer can achieve easy formation of a reflective layer, resulting in as high a white reflectivity as that of paper. For the white particles, particles made of general metal oxides are employed specific examples metal oxides include titanium oxide, aluminum oxide, zinc oxide, silicon oxide, cesium oxide and yttrium oxide. For the resin, any transparent resin can be employed; representative examples thereof include acrylic resins, vinyl acetate resins, polyester resins, polyamide resins, polyolefin resins and urethane resins.

The white color reflective layer can be formed by applying it on the surface of a counter electrode, and various coating methods can be used for this purpose; with an easy-to-use method such as doctor blading or spin coating, it is possible to form a reflective layer of uniform thickness.

A method of dispersing pigment fine particles into an electrolyte is known as an alternative method of achieving high white reflectivity. With this method pigment fine particles may be previously dispersed into an electrolyte, and the resultant solution is mixed into a display device. This method requires no resin for the immobilization of pigment fine particles and thus the conductivity inside the display device is excellent. Thus, it is possible to drive the display device at low voltage. For the pigment fine particles, particles made of general metal oxides can be employed, as for the white particles; specific examples metal oxides include titanium oxide, aluminum oxide, zinc oxide, silicon oxide, cesium oxide and yttrium oxide.

Examples of the electrolyte include liquid electrolytes obtained by dissolving lithium salts such as lithium perchlorate and lithium borofluoride in organic solvents such as acetonitrile and propylene carbonate; and solid electrolytes such as perfluorosulfonic acid polymer film Liquid electrolytes have the advantage of high ion conductivity. Solid electrolytes suffer very little degradation and thus are suitable for the preparation of devices that require high durability.

Active-matrix driving of the display device of the present invention can be achieved by providing drive elements either on the surface of the display electrode or on the surface of the counter electrode. Achieving high-definition images in an A4-size monitor absolutely requires control in which active drive elements are used Active-matrix driving of the display device of the present invention can be readily achieved by providing active drive elements on the surface of the counter electrode.

Here, FIG. 1 shows an example of the configuration of the display device of the present invention.

In FIG. 1 a reference numeral 1 denotes a display electrode; 2, a counter electrode; 3, conductive or semi-conductive particles constituting a display layer; 4, an electrolyte; and 5, a white color reflective layer.

Figure 2:
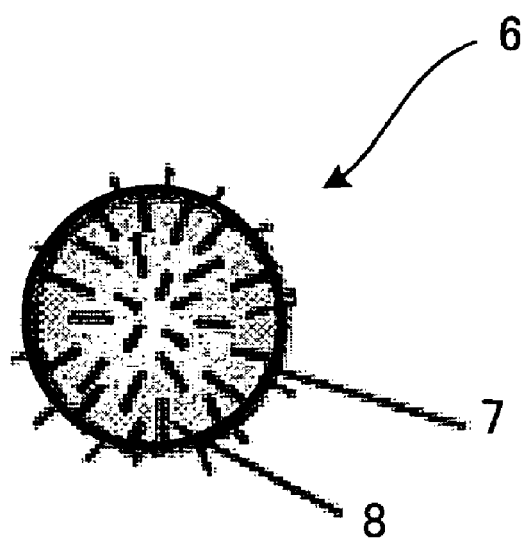
FIG. 2 is an enlarged view of a conductive or semi-conductive fine particle constituting a display layer shown in FIG. 1.

FIG. 2 is an enlarged view of the conductive or semi-conductive particle 3 constituting the display layer shown in FIG. 2. In FIG. 2 a reference numeral 7 denotes an insulating or semi-conductive substance; 8, an organic electrochromic compound.

According to the present invention, it is possible to provide a display devise with excellent image-retaining properties by providing the display device with a display layer containing electrochromic compositions in which conductive or semi-conductive fine particles having an insulating or semi-conductive substance attached to their surface carry an organic electrochromic compound.

In this case, the use of metal oxides for such an insulating or semi-conductive substance can facilitate a surface treatment for the fine particles, making it possible to inexpensively provide a display device with excellent image-retaining properties. The use of aluminum oxide for the insulating or semi-conductive substance can make it possible to inexpensively provide a display device with excellent image-retaining properties. The simultaneous use of a plurality of organic EC compounds can offer a wide range of display colors and makes it possible to provide a display device capable of displaying a black color with high visibility. It is possible to provide a display device capable of offering high image quality by forming a display layer in any given pattern. It is possible to provide a display device with excellent white reflectivity by providing a white color reflective layer between the display electrode provided with a display layer and the counter electrode. It is possible to provide a display device which can be driven at low voltage, by allowing an electrolyte to contain pigment fine particles. Further, the formation of drive elements can achieve active-matrix driving of a display device to support large-size, high-definition image display. Furthermore, it is possible to provide a reflective display device with excellent image-retaining properties.

The display device of the present invention can be used for example for the display unit of mobile devices such as laptop computers, PDAs and cellular phones; electronic paper such as electronic books and electronic newspaper; electronic bulletin boards such as advertising signs, posters and black boards; the display unit of copiers, rewritable paper as substitute for printer sets, calculators and electronic appliances; the display unit of discount cards; electronic advertisement; and electronic POP. Specifically, the display device of the present invention is suitable for the image display apparatus descried below.

(Display Apparatus)

The display apparatus of the present invention includes the foregoing display device, a drive circuit an arithmetic circuit, an internal memory and a power source, and further includes an additional unit on an as-needed basis.

The display apparatus of the present invention adopts the display device of the present invention, which has high white reflectivity and a memory effect and which can be driven at low voltage and has excellent image-retaining properties. Thus, it is possible to provide a display apparatus offering excellent display performance.

Figure 3:
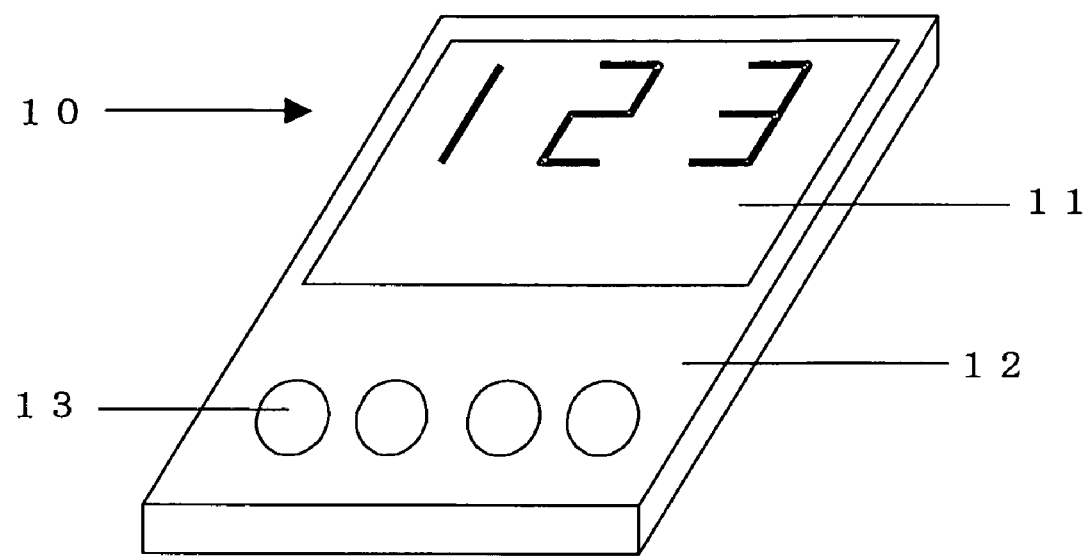
FIG. 3 shows an example of a display apparatus using the display device of the present invention.

Here, FIG. 3 is a schematic view showing an example of the display apparatus of the present invention. As shown in FIG. 3, a display apparatus 10 includes a display device 11, a housing 12, and an information receiving unit 13. The display apparatus 10 further includes, for example, a drive circuit, an arithmetic circuit, an internal memory, and a power source, which are not shown. The electrode of the display device 11 constitutes a dot matrix, and turning on the designated dots creates an image as a whole.

Hereinafter, Examples of the present invention will be described, which shall not be construed as limiting the scope of the invention thereto.

EXAMPLE 1

For conductive or semi-conductive fine particles having an insulating or semi-conductive substance attached, titanium oxide fine particles having an average primary particle diameter of 6 nm (produced by Tayca Co., Ltd), which had been surface-treated with aluminum oxide, were used.

For an organic EC compound, 1-Ethyl-1'-(2-phosphonoethyl)-4,4-bipyridinium dichloride (hereinafter abbreviated to "EPBp") was used.

A 20% by mass dispersion of the surface treated titanium oxide fine particles in toluene was applied by spin coating on a portion (area=1 cm$^2$) of a glass substrate in a thickness of 2 μm. The surface of the glass substrate is entirely covered with a transparent electrode film made of tin oxide. The glass substrate then underwent sintering at 450° C. for 1 hour. In this way a display electrode was produced EPBp was then dissolved in water to a concentration of 0.04M, and the display electrode thus produced was immersed in the resultant aqueous solution. In this way a display electrode having EPBp attached to the surface was produced.

A 20% by mass dispersion of tin oxide fine particles having an average primary particle diameter of 30 nm (produced by Mitsubishi Materials Corporation) water was applied by spin coating on a glass substrate in a thickness of 2 μm. The surface of the glass substrate is entirely covered with a transparent electrode film made of tin oxide. The glass substrate then underwent sintering at 450° C. for 1 hour. In this way a counter electrode was produced.

The display electrode provided with the display layer was bonded to the counter electrode, with spacers of 75 μm site interposed therebetween. In this way a cell was produced. Lithium percorate was dissolved in propylene carbonate to a concentration of 0.2M and titanium oxide particles having an average primary particle diameter of 300 nm (produced by Ishihara Sangyo Co., Ltd) were dispersed in the resultant solution to a concentration of 35% by mass to prepare an electrolyte solution. The electrolyte solution thus prepared was sealed in the cell. Thus, a display device of Example 1 was produced.

—Evaluation of the Display Device—

The white reflectivity of the display device measured without applying a voltage was as high as 60%. Note that the measurement was made by irradiating the display device with diffusive light using a spectophotometer (CM-3730d, manufactured by Konica Minolta Inc.)

Next the display electrode and counter electrode of the display device were connected to a negative pole and a positive pole, respectively. Applying a voltage of 3.0V across the two electrodes for a sufficient time caused only a certain portion of the display layer of the display electrode to produce a red-purple odor, which is as a result of color production by EPBp. Applying a voltage of −4.0V across the two electrodes for a sufficient time then caused that portion to turn white (original color).

Subsequently, the display electrode and counter electrode of the display device were again connected to the negative pole and the positive pole, respectively. Applying a voltage of 3.0V across the two electrolytes for a sufficient time caused only a certain portion of the display layer of the display electrode to produce a red-purple color. In this state, the display device was detached from the power source and was allowed to stand. The display device was still in a colored state even after a lapse of 2 hours.

EXAMPLE 2

A display device having a similar configuration as that of the display device produced in Example 1 was produced in a similar manner described in Example 1, with exception that titanium oxide fine particles having an average primary particle diameter of 6 nm (produced by Tayca Co., Ltd), which had been surface-treated with zirconium oxide, were adopted as conductive or semi-conductive fine particles having an insulating or semi-conductive substance attached to the surface.

—Evaluation of the Display Device—

The display electrode and counter electrode of the display device were connected to a negative pole and a positive pole, respectively. Applying a voltage of 3.0V across the two electrodes for a sufficient time caused only a certain portion of the display layer of the display electrode to produce a red-purple color, which is as a result of color production by EPBp. Applying a voltage of −4.0V across the two electrodes for a sufficient time then caused that portion to turn white (original color).

Subsequently, the display electrode and counter electrode of the display device were again connected to the negative pole and the positive pole, respectively. Applying a voltage of 3.0V across the two electrodes for a sufficient time caused only a certain portion of the display layer of the display electrode to produce a red-purple color. In this state, the display device was detached from the power source and was allowed to stand. The display device was still in a colored state even after a lapse of 1 hour and 30 minutes.

EXAMPLE 3

A display device having a similar configuration as that of the display device produced in Example 1 was produced in a similar manner described in Example 1, with exception that titanium oxide fine particles having an average primary particle diameter of 6 nm (produced by Tayca Co., Ltd), which had been surface-treated with a 3:1 mixture of aluminum oxide and zirconium oxide, were adopted as conductive or semi-conductive fine particles having an insulating or semi-conductive substance attached to their surface.

—Evaluation of the Display Device—

The display electrode and counter electrode of the display device were connected to a negative pole and a positive pole, respectively. Applying a voltage of 3.0V across the two electrodes for a sufficient time caused only a certain portion of the display layer of the display electrode to produce a red-purple color, which is as a result of color production by EPBp. Applying a voltage of −4.0V across the two electrodes for a sufficient time then caused that portion to turn white (original color).

Subsequently, applying a voltage of 3.0V across the two electrodes for a sufficient time caused only a certain portion of the display layer of the display electrode to produce a red-purple color. In this state, the display device was detached from the power source and was allowed to stand. The display device was still in a colored state even after a lapse of 2 hours.

EXAMPLE 4

A display device having a similar configuration as that of the display device produced in Example 1 was produced in a similar manner described in Example 1, with exception that EPBp and 1-p-cyanophenyl-1'-(2-phosphonoethyl-4,4'-bipyridinium dichlonde (hereinafter abbreviated to "CNPhPBp") were adopted as organic EC compounds. An aqueous solution used for the attachment of the organic EC compounds was prepared by mixing equal volumes of a 0.04M aqueous solution of EPBp and a 0.04M aqueous solution of CNPhPBp.

—Evaluation of the Display Device—

The white reflectivity of the display device measured without applying a voltage was as high as 60%.

Next, the display electrode and counter electrode of the display device were connected to a negative pole and a positive pole, respectively. Applying a voltage of 3.0V across the two electrodes for a sufficient time caused only a certain portion of the display layer of the display electrode to produce a black color, which is as a result of simultaneous color production by EPBp and CNPhBp. Applying a voltage of −4.0V across the two electrodes for a sufficient time then caused that portion to turn white (original color).

Subsequently, the display electrode and counter electrode of the display device were again connected to the negative pole and the positive pole, respectively. Applying a voltage of 3.0V across the two electrodes for a sufficient time caused only a certain portion of the display layer of the display electrode to produce a black color. In this state, the display device was detached from the power source and was allowed to stand. The display device was still in a colored state even after a lapse of 2 hours.

EXAMPLE 5

Titanium oxide particles having an average primary particle diameter of 300 nm (produced by Ishihara Sangyo Co., Ltd.) were adopted as white particles, polyethylene was adopted as resin, and methylcydohexanone was adopted as a solvent. In 10 ml of methylcydohexanone was dissolved 1 g of polyethylene, and 5 g of titanium oxide was dispersed in the resultant mixture.

The dispersion thus prepared was then applied onto the counter electrode produced in Example 1 by spin coating rotational speed: 3,000 rpm, time: 30 seconds). The thickness of the formed film was about 5 μm, and was as white as paper.

The display electrode which was produced in Example 1 and has a display layer was bonded to the counter electrode, with spacers of 75 μm size interposed therebetween. In this way a cell was produced. An electrolyte solution was prepared by dissolving lithium perchlorate in propylene carbonate to a concentration of 0.2M. The electrolyte solution thus prepared was sealed in the cell. In this way a display device of Example 5 was produced.

—Evaluation of the Display Device—

The white reflectivity of the display device measured without applying a voltage was as high as 60%.

Next, the display electrode and counter elect of the display device were connected to a negative pole and a positive pole, respectively. Applying a voltage of 3.2V across the two electrodes for a sufficient time caused only a certain portion of the display layer of the display electrode to produce a red-purple color, which is as a result of color production by EPBp. Applying a voltage of −4.2V across the two electrodes for a sufficient time then caused that portion to turn white (original color).

Subsequently, the display electrode and counter electrode of the display device were again connected to the negative pole and the positive pole, respectively. Applying a voltage of 3.2V across the two electrolytes for a sufficient time caused only a certain portion of the display layer of the display electrode to produce a red-purple color. In this state, the display device was detached from the power source and was allowed to stand. The display device was still in a colored state even after a lapse of 2 hours.

EXAMPLE 6

Using an inkjet printer (manufactured by SEIKO EPSON Corporation), a 20 wt % dispersion of the surface-treated titanium oxide fine particles in toluene was applied on a portion (area=1 cm$^2$) of a glass substrate in a thickness of 2 μm. The surface of the glass substrate is entirely covered with a transparent electrode film made of tin oxide, whereby a display layer was provided that has a pattern of 10 μm wide-lines separated by 10 μm spaces. The glass substrate then underwent sintering at 450° C. for 1 hour, and immersed in a 0.04M aqueous solution of EPBp. In this way a display electrode having EPBp attached to the surface was produced.

A display device having a similar configuration as that of the display device produced in Example 1 was produced in a similar manner described in Example 1, with exception that the foregoing display electrode was used.

—Evaluation of the Display Device—

The display electrode and counter electrode of the display device were connected to a negative pole and a positive pole, respectively. Applying a voltage of 3.0V across the two electrodes for a sufficient time caused only a line pattern of the display layer of the display electrode to produce a red-purple color, which is as a result of color production by EPBp. Applying a voltage of −40V across the two electrodes for a sufficient time then caused that line pattern to turn white (original color).

COMPARATIVE EXAMPLE 1

A display device was produced in a similar manner described in Example 1, with exception that titanium oxide fine particles having an average primary particle diameter of 6 nm (produced by produced by Tayca Co., Ltd), which had not been subjected to a surface treatment, were adopted as conductive or semi-conductive fine particles.

—Evaluation of the Display Device—

The white reflectivity of the display device measured without applying a voltage was as high as 60%.

Next, the display electrode and counter electrode of the display device were connected to a negative pole and a positive pole, respectively. Applying a voltage of 3.0V across the two electrodes for a sufficient time caused only a certain portion of the display layer of the display electrode to produce a red-purple color, as in Example 1. In this state, the display device was detached from the power source and was allowed to stand. The red-purple color disappeared in about 20 minutes.

What is claimed is:

1. A display device, comprising:
   a display electrode;
   a counter electrode provided to face the display electrode;
   a display layer provided on a counter electrode-side surface of the display electrode; and
   an electrolyte provided between the display electrode and the counter electrode,
   wherein the display layer includes conductive or semi-conductive fine particles, the fine particles include an insulating or semi-conductive substance attached to the surface thereof, and the fine particles carry an organic electrochromic compound.

2. The display device according to claim 1, wherein the insulating or semi-conductive substance comprises a metal oxide.

3. The display device according to claim 2, wherein the metal oxide is at least one of aluminum oxide and zirconium oxide.

4. The display device according to claim 1, wherein the conductive or semi-conductive fine particles have an average primary particle diameter of 5 nm to 50 nm.

5. The display device according to claim 1, wherein the conductive or semi-conductive fine particles are titanium oxide fine particles.

6. The display device according to claim 1, wherein the conductive or semi-conductive fine particles carry a plurality of organic electrochromic compounds.

7. The display device according to claim 1, wherein the organic electrochromic compound is a viologen compound.

8. The display device according to claim 1, wherein the counter electrode has a white color reflective layer on the display electrode-side surface.

9. The display device according to claim 1, wherein the electrolyte comprises white pigment particles.

10. The display device according to claim 9, wherein the white pigment particles are titanium oxide particles.

11. The display device according to claim 1, wherein the display layer is formed in any given pattern.

12. The display device according to claim 1, wherein a drive element is formed on the surface of one of the display electrode and the counter electrode.

13. A display apparatus using a display device which comprises:
   a display electrode;
   a counter electrode provided to face the display electrode;
   a display layer provided on a counter electrode-side surface of the display electrode; and
   an electrolyte provided between the display electrode and the counter electrode,
   wherein the display layer includes conductive or semi-conductive fine particles, the fine particles include an insulating or semi-conductive substance attached to the surface thereof, and the fine particles carry an organic electrochromic compound.

* * * * *